US011350555B2

(12) United States Patent
Rewis et al.

(10) Patent No.: US 11,350,555 B2
(45) Date of Patent: Jun. 7, 2022

(54) STALK PULLER (71) Applicant: Kelley Manufacturing Co., Tifton, GA (US)

(72) Inventors: Matthew Rewis, Tifton, GA (US); Charles Sumner, Chula, GA (US); Bennie G. Branch, Tifton, GA (US)

(73) Assignee: Kelley Manufacturing Co., Tifton, GA (US)

( * ) Notice: Subject to any disclaimer, the term of this patent is extended or adjusted under 35 U.S.C. 154(b) by 190 days.

(21) Appl. No.: 16/832,223

(22) Filed: Mar. 27, 2020

(65) Prior Publication Data
US 2020/0221623 A1 Jul. 16, 2020

Related U.S. Application Data (62) Division of application No. 15/901,836, filed on Feb. 21, 2018, now Pat. No. 10,980,163.

(60) Provisional application No. 62/464,258, filed on Feb. 27, 2017.

(51) Int. Cl.
*A01B 43/00* (2006.01)
*A01D 34/835* (2006.01)
*A01D 43/12* (2006.01)
*A01D 43/00* (2006.01)
*A01D 46/08* (2006.01)
A01D 34/44 (2006.01)
A01B 29/04 (2006.01)

(52) U.S. Cl.
CPC .......... *A01B 43/00* (2013.01); *A01D 34/8355* (2013.01); *A01D 43/00* (2013.01); *A01D 43/12* (2013.01); *A01D 46/08* (2013.01); A01B 29/04 (2013.01); A01D 34/44 (2013.01)

(58) Field of Classification Search
CPC ........ A01D 43/00; A01D 43/12; A01D 43/10; A01D 33/06; A01D 34/8355; A01D 46/08; A01B 39/08; A01B 39/18; A01B 43/00
See application file for complete search history.

(56) References Cited

U.S. PATENT DOCUMENTS

| 3,133,598 | A | * | 5/1964 | Caldwell | A01D 34/42 172/51 |
| 3,678,671 | A | | 7/1972 | Scarmato | |
| 3,770,064 | A | * | 11/1973 | Scarnato | A01D 25/04 171/58 |
| 3,815,266 | A | * | 6/1974 | Schmitz | A01G 23/062 37/302 |
| 3,898,752 | A | * | 8/1975 | Ulve | A01G 23/062 37/302 |
| 3,946,681 | A | * | 3/1976 | Sylvester | A01B 49/04 111/124 |

(Continued)

FOREIGN PATENT DOCUMENTS

CN 106171258 A * 12/2016
FR 2923676 A1 * 5/2009 ......... A01D 34/8355

*Primary Examiner* — Adam J Behrens
(74) *Attorney, Agent, or Firm* — Laurence P. Colton; Smith Tempel Blaha LLC (57) ABSTRACT A stalk puller to be used with or without a mower/shredder utilizes a pair of independently mounted discs converging along their lower edge to grasp and pull stalks from the ground as the stalk puller is moved down the row by a prime mover. At least one of the discs is urged against the other by a spring such that the associated disc may allow rocks and debris to pass between the discs without damage. The spring mounting reduces adjustments due to normal wear as well as damage from debris.

9 Claims, 6 Drawing Sheets (56) References Cited

U.S. PATENT DOCUMENTS

| | | | |
|---|---|---|---|
| 4,015,667 A | 4/1977 | Ruozi | |
| 4,295,532 A * | 10/1981 | Williams | A01C 7/006 |
| | | | 172/184 |
| 4,459,796 A * | 7/1984 | Stokes | A01D 34/8355 |
| | | | 56/14.3 |
| 4,483,401 A * | 11/1984 | Robertson | A01C 5/064 |
| | | | 172/574 |
| 4,751,812 A | 6/1988 | Lubetzky | |
| 4,779,684 A * | 10/1988 | Schultz | A01B 35/18 |
| | | | 171/62 |
| 4,921,050 A | 5/1990 | Brown | |
| 5,354,003 A * | 10/1994 | Stokes | A01D 34/8355 |
| | | | 241/101.763 |
| 5,467,828 A | 11/1995 | Ruozi | |
| 5,482,120 A * | 1/1996 | Lloyd | A01B 41/04 |
| | | | 172/21 |
| 5,953,895 A * | 9/1999 | Hobbs | A01D 34/8355 |
| | | | 56/500 |
| 6,068,061 A * | 5/2000 | Smith | A01B 13/08 |
| | | | 172/139 |
| 6,185,919 B1 * | 2/2001 | Borchard | A01D 34/8355 |
| | | | 241/101.763 |
| 8,393,407 B2 * | 3/2013 | Freed | A01B 35/28 |
| | | | 172/551 |
| 2002/0084083 A1 * | 7/2002 | Nelson | A01D 43/12 |
| | | | 172/624.5 |
| 2004/0256122 A1 * | 12/2004 | Roibier | A01B 63/26 |
| | | | 172/307 |
| 2011/0258979 A1 * | 10/2011 | Darden | A01D 34/8355 |
| | | | 56/504 |
| 2012/0031066 A1 * | 2/2012 | Neudorf | A01D 34/8355 |
| | | | 56/502 |
| 2014/0174769 A1 * | 6/2014 | Hinton | A01D 34/8355 |
| | | | 171/58 |
| 2014/0196430 A1 * | 7/2014 | Windhausen | A01D 34/8355 |
| | | | 56/502 |
| 2015/0096773 A1 * | 4/2015 | Miller | A01D 34/8355 |
| | | | 172/540 |
| 2016/0007530 A1 * | 1/2016 | Awater | A01D 34/73 |
| | | | 56/52 |
| 2018/0007834 A1 * | 1/2018 | Martin | A01D 34/835 |
| 2018/0263174 A1 * | 9/2018 | Hodel | A01C 7/203 |

* cited by examiner

STALK PULLER

CROSS REFERENCE TO RELATED APPLICATIONS

This application is a divisional of and claims priority from and the benefit of U.S. patent application Ser. No. 15/901,836 having a filing date of 21 Feb. 2018, which claims priority from and the benefit of U.S. Provisional Patent Application No. 62/464,258 having a filing date of 27 Feb. 2017.

BACKGROUND OF THE INVENTION

Technical Field

The present invention relates to a farming implement used to clear fields of stalks after crops have been harvested therefrom.

Prior Art

Cotton stalks have always created a problem for farmers after harvest. After cotton is harvested, the stalks remain as an undesired after product that farmers have to deal with. The stalks are undesired because they harbor unwanted pests, are slow to deteriorate, and can damage equipment. In history, the boll weevil almost destroyed all cotton production. It was discovered that the boll weevil would harbor in cotton stalks over winter. One method of fighting back against the boll weevil was to completely destroy the stalks after harvest. This was one part of the Boll Weevil Eradication Program that was instituted to wipeout the boll weevil. While the boll weevil is no longer a major threat to most of the United States, many farmers still want to take preventive action against it. Another problem is that the root of the cotton stalk will also harbor nematodes. The combination of these two pests makes it desirable to destroy the stalks and dislodge the root from the ground.

The cotton stalk, if left whole, deteriorates at a slow pace. If the stalk is shredded it increases the rate of deterioration. When cotton stalks do not deteriorate, they create problems for field operations in following seasons. Problems include stalks hanging on ripper points or planters and creating an undesired furrow. If the cotton stalk tops are mowed or shredded and not completely pulled, the remaining stalk can cause excessive wear and punctures on tractor and equipment tires. If the stalks are not mowed, they can catch loose wires or hoses on the tractor and implement and break them.

Various attempts to deal with the problems exist in the prior art. One prior art machine has two rubber tire pullers that are driven by a ground contact cutter drum in the rear. This apparatus has many limitations. If the soil is too wet it can stick to the cutter drum making the drum into a large ball, rendering the cutter useless. If the soil is too dry, it will break the stalk off near the ground and not pull it. The machine also leaves the field in a rough condition. When follow up operations are performed behind this, it is a very rough ride for the operator and consequently ground speeds are reduced. It is also a very heavy machine, which requires a larger tractor to pull it. The size of the remaining debris is also a concern for many farmers. It leaves the stalks too long and creates dragging issues on tools that run after this machine.

A similar device has an undercutting blade ahead of the ground contact cutter drum. One major problem farmers have with this unit is the blade that runs under the stalks disturbs too much soil creating erosion problems. The undercutting blades also leave the soil loose in front on the cutting drum. The loose dirt does not create a firm enough counter shear for the cutter drum and the stalk is not always cut. The cutter drum on this unit has the same problem as the first mentioned unit when running in wet conditions. The cutter drum will ball up.

There are other methods that can achieve a desired result, but require multiple operations. One of these methods is to run a shredder and shred the stalks leaving the root in the ground. A second pass is required by either a disc puller or a disc harrow to remove the root. In this situation, the pullers disturb less soil and perform better; however, this method creates at least two trips through the field and consumes more fuel.

Prior art designs for disc pullers require much maintenance. The two discs have to keep proper tension between them to firmly grasp the stalks while removing them. If the proper tension is not kept the discs will slip on the stalk and not pull them. Since the discs wear as they are used, the tension needs to be adjusted multiple times, often daily. The other major problem with the disc pullers is they are rigid. Consequently, when a large stalk or other large debris is forced into the pinch point between the discs it causes the discs or discs arms to flex creating an excessive shock load on the bearings. For example, rocks encountered by the disc puller at the pinch point can damage the blades or the bearing. This leads to premature bearing or machine failure. One additional problem with these pullers is that they have poor depth control in that the drive paddles commonly attached to the back of the discs are not alone sufficient for accurate depth control. The issue with this is in soft ground the discs will disturb too much soil.

BRIEF SUMMARY OF THE INVENTION

A general object of the invention is to reduce the problems caused by leaving crop stalks and roots standing and intact in the field after harvest.

A further object of the invention is to provide a stalk puller that is self-adjusting.

Yet another object of the invention is to provide a stalk puller that is not subject to damage from rocks and debris engaged by the discs.

A further object of the invention is to reduce the disruption of the soil by the stalk puller.

A still further object of the invention is to incorporate the improved stalk puller into a single pass machine.

BRIEF DESCRIPTION OF THE DRAWINGS

Referring to the drawings which are appended hereto and which form a portion of this disclosure, it may be seen that.

DETAILED DESCRIPTION OF PREFERRED EMBODIMENTS

Figure 1:
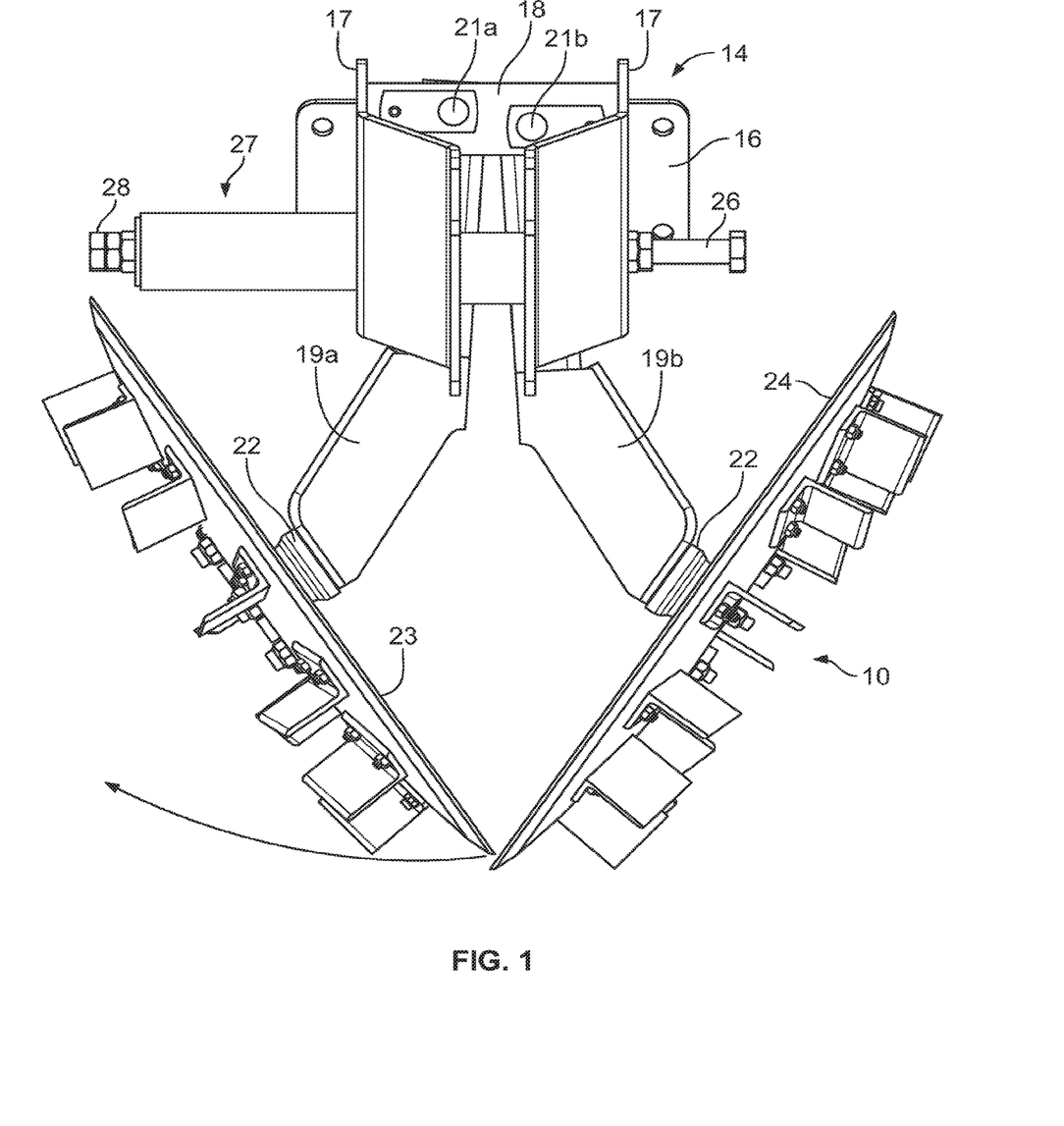
FIG. 1 is a front elevation view of a stalk puller.
Figure 2:
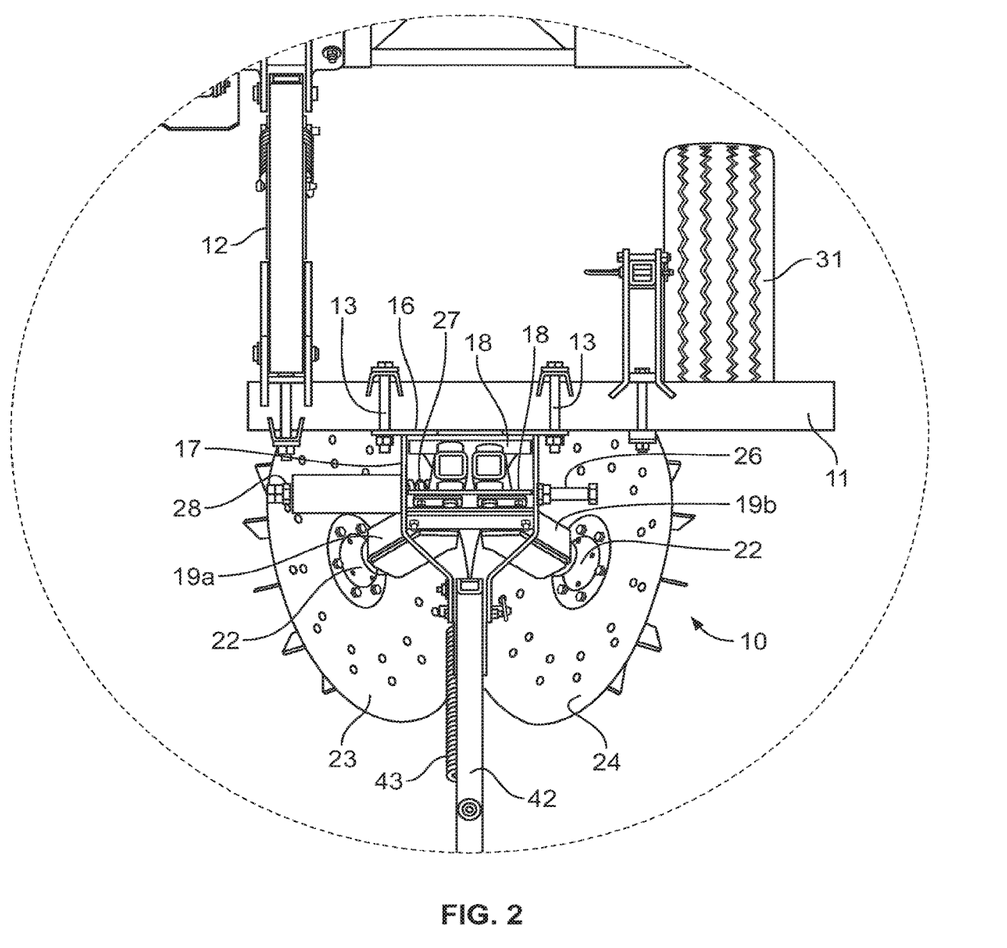
FIG. 2 is a top plan view of one embodiment of our stalk puller.
Figure 3:
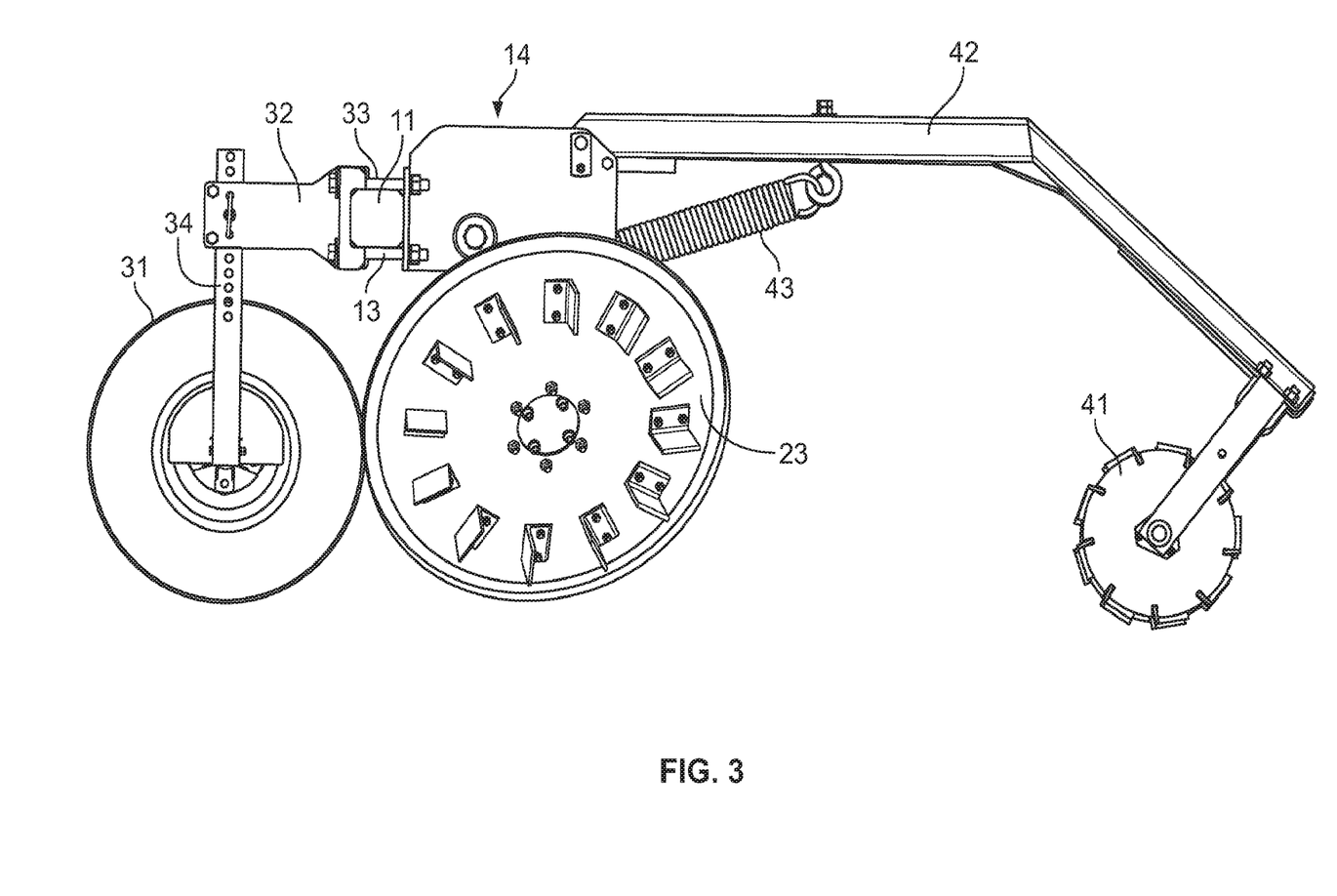
FIG. 3 is a side elevation view of the puller-guide wheel-roller assembly.

Referring to the drawings for a clearer understanding of the invention, note in FIGS. 1 to 3 our improvement is to connect a tool bar 11 extending transversely to the direction of travel an associated prime mover or tractor (not shown). The tool bar 11 is connected to a parallel linkage 12 such as disclosed in U.S. patent application Ser. No. 14/205,796, which is incorporated herein by reference, which connect to the forward machinery. Connected to the tool bar 11 by conventional U bolts 13 is a weldment 14 other mounting structure that supports and is incorporated into our improved disc puller 10. Weldment 14 includes a forward plate 16, pair of vertical sidewalls 17 extending rearward from forward plate 16, and a pair of cross braces 18 extending between sidewalls 17 and spaced apart from each other. Cross braces 18 support a pair of disc arms 19a and 19b on a pair of pivot pins 21. Each disc arm includes an upper generally vertical section and a lower angled section such that the lower sections of 19a and 19b diverge. A disc hub connection 22 is mounted at the lower end of each disc arm 19a and 19b to support a pair of rotatable discs 23 and 24 which engage the plant stalks.

Disc arm 19b supporting rotatable disc 24 is maintained in a centered position relative to the weldment by adjustment bolt 26. Disc arm 19a supporting rotatable disc 23 is influenced by compression spring 27 under tensioning control of tension bolt 28. As will be seen in FIG. 3, disc arm 19a is mounted slightly higher than disc arm 19b such that the peripheral edge of disc 23 bears against the concave surface of disc 24 near the edge of disc 24. Note that the same configuration of the disc edges may be achieved by making disc arm 19a shorter than disc arm 19b. The adjustment bolt 26 is used to keep the pinch point of the discs 23 and 24 centered on the crop row. The amount of force urging disc 23 against disc 24 from compression spring 27 is controlled by tensioning bolt 28 to vary the amount of force between the discs 23 and 24. It will be understood that the discs rotate due to movement of prime mover causing interaction with the soil and stalks such that the discs momentarily grasp the stalks and pulling them forwardly as the prime mover pulls the discs over the ground. Further forward movement causes the discs to rotate and diverge from the stalk releasing it to the ground. When a rock or an excessively large stalk is encountered the spring 27 allows disc 23 and arm 19a to move laterally along the arrow shown in FIG. 1 to avoid damage.

The disk pullers were designed to correct the problems of the prior art disc pullers. The compression spring 27 eliminates the constant adjustment of the puller discs 23 and 24 and allows large objects to pass through the convergence of discs 23 and 24 without damaging the unit. Also, the action of the compression spring 27 is such that as the discs wear the change of force applied to the disc 23 is minor. It may also be understood that both disc arm 19a and 19b may be spring biased in the same manner if so desired.

Another unique feature is that the cutting depth of the discs is controlled by a gauge wheel 31. The gauge wheel 31 prevents the discs 23 and 24 from disturbing more soil than is necessary to dislodge the stalks from the ground. The gauge wheel 31 may be incorporated into the individual stalk puller or may be mounted adjacently using tool bar 11 as shown in FIGS. 1 and 2. Referring to FIG. 3, it may be more clearly seen that gauge wheel 31 is connected to tool bar 11 by a bracket 32 and cooperative U bolts 33. Bracket 32 cooperatively receives an adjustable wheel leg 34 that carries a conventional axle for gauge wheel 31. Wheel leg 34 allows for incremental adjustment of gauge wheel 31 relative to tool bar 11 and thus to stalk puller 10 to control the depth of engagement with discs 23 and 24. As may be seen in FIG. 3, the stalk puller 10 may be coupled with the gauge wheel 31 and a roller basket 41 for use after the field has been cleared of the crop. Roller basket 41 is also mounted to tool bar 11 using a clevis like attachment to weldment 14 and an extension arm 42 biased toward the ground by a spring 43 mounted between extension arm 42 and the weldment 14. It will be appreciated that the extension arm could be attached separately to the tool bar 11 or the roller basket 41 may be ganged with other roller baskets behind additional stalk pullers. The roller basket 41 finishes the field off to leave it smoother and removes excess soil from the root ball. The arrangement shown in FIG. 3 is a standalone unit, with the mowing operation conducted separately.

Figure 4:
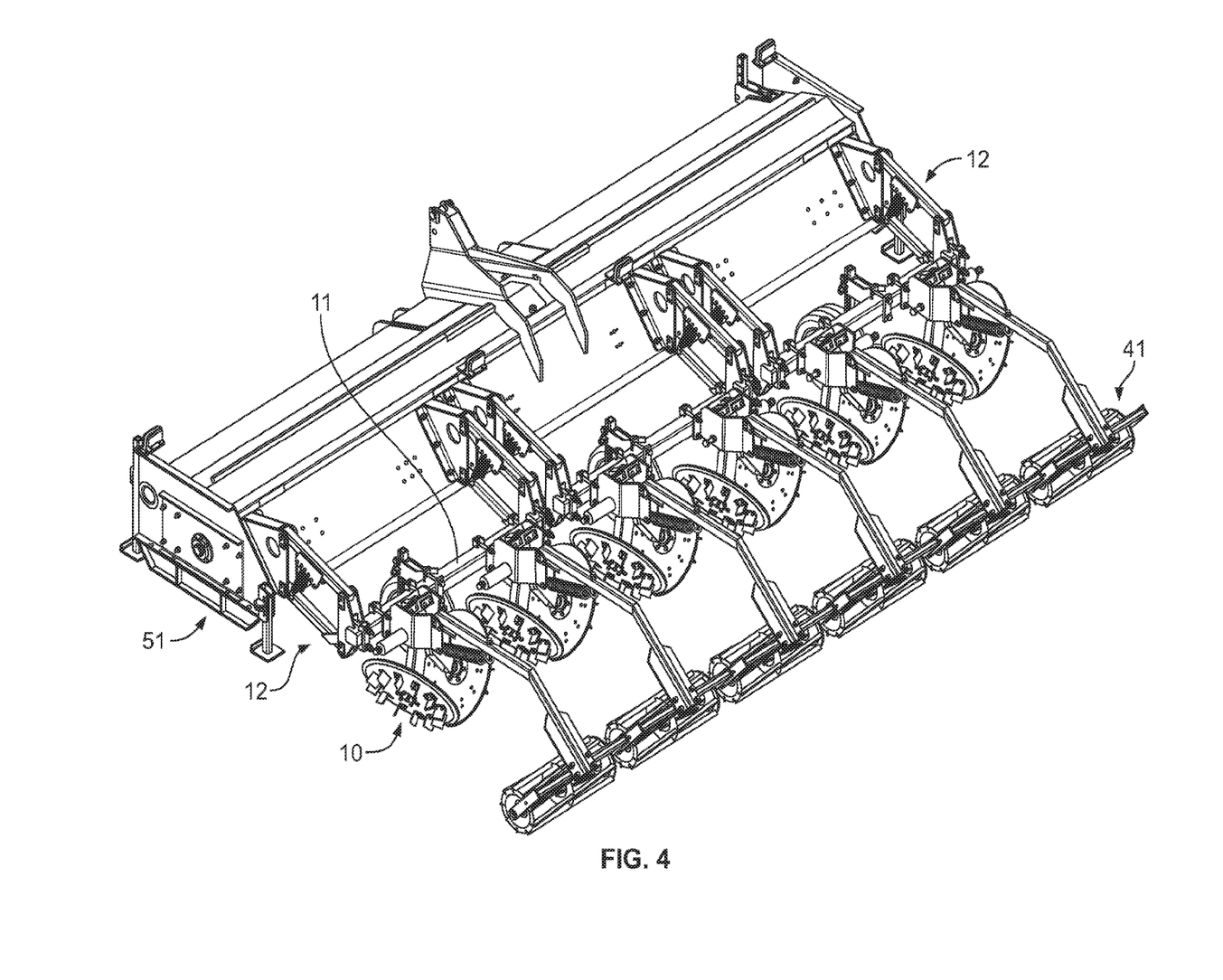
FIG. 4 is a perspective view of a single pass apparatus.
Figure 5:
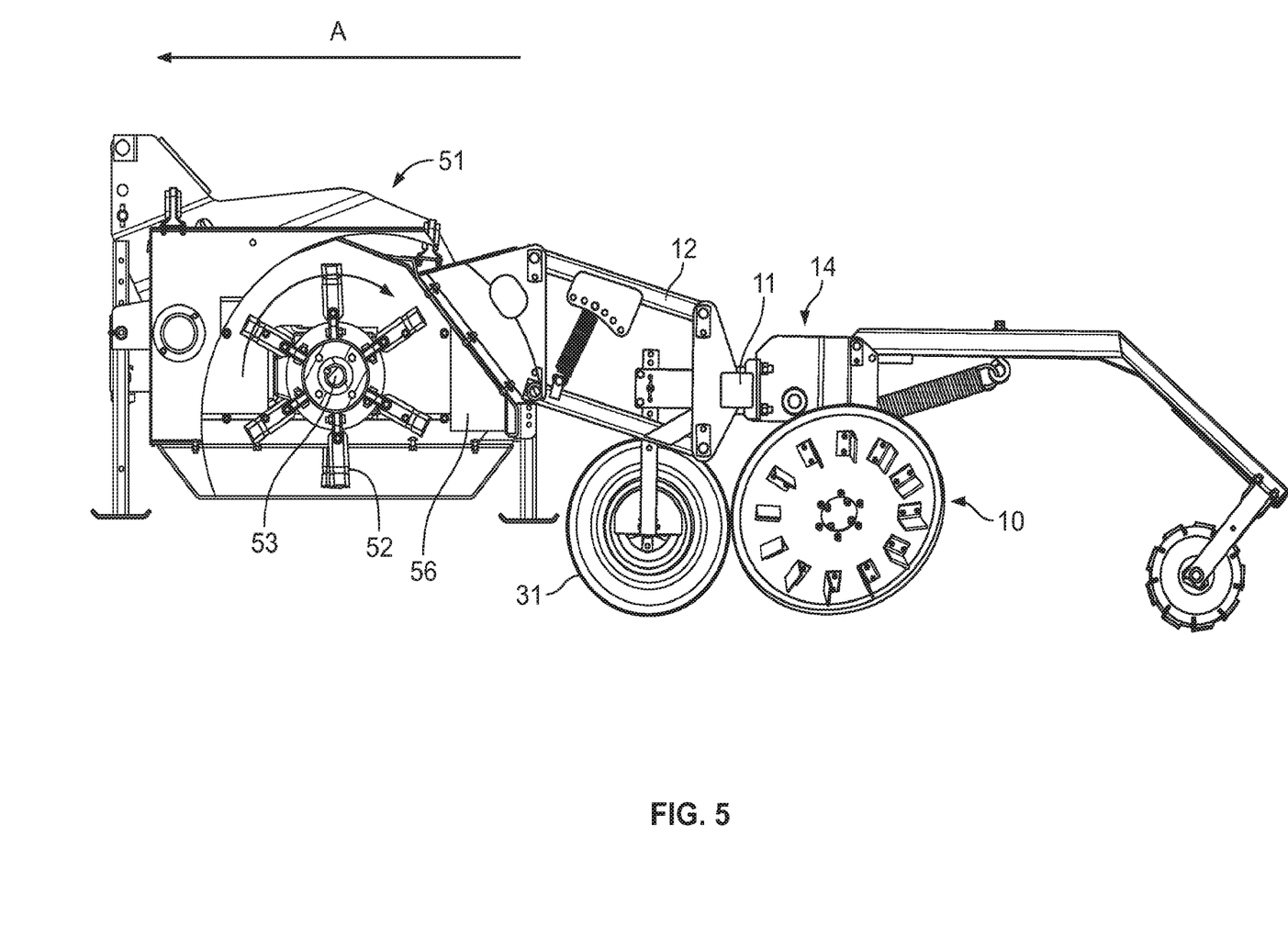
FIG. 5 is a side view of the single pass apparatus.
Figure 6:
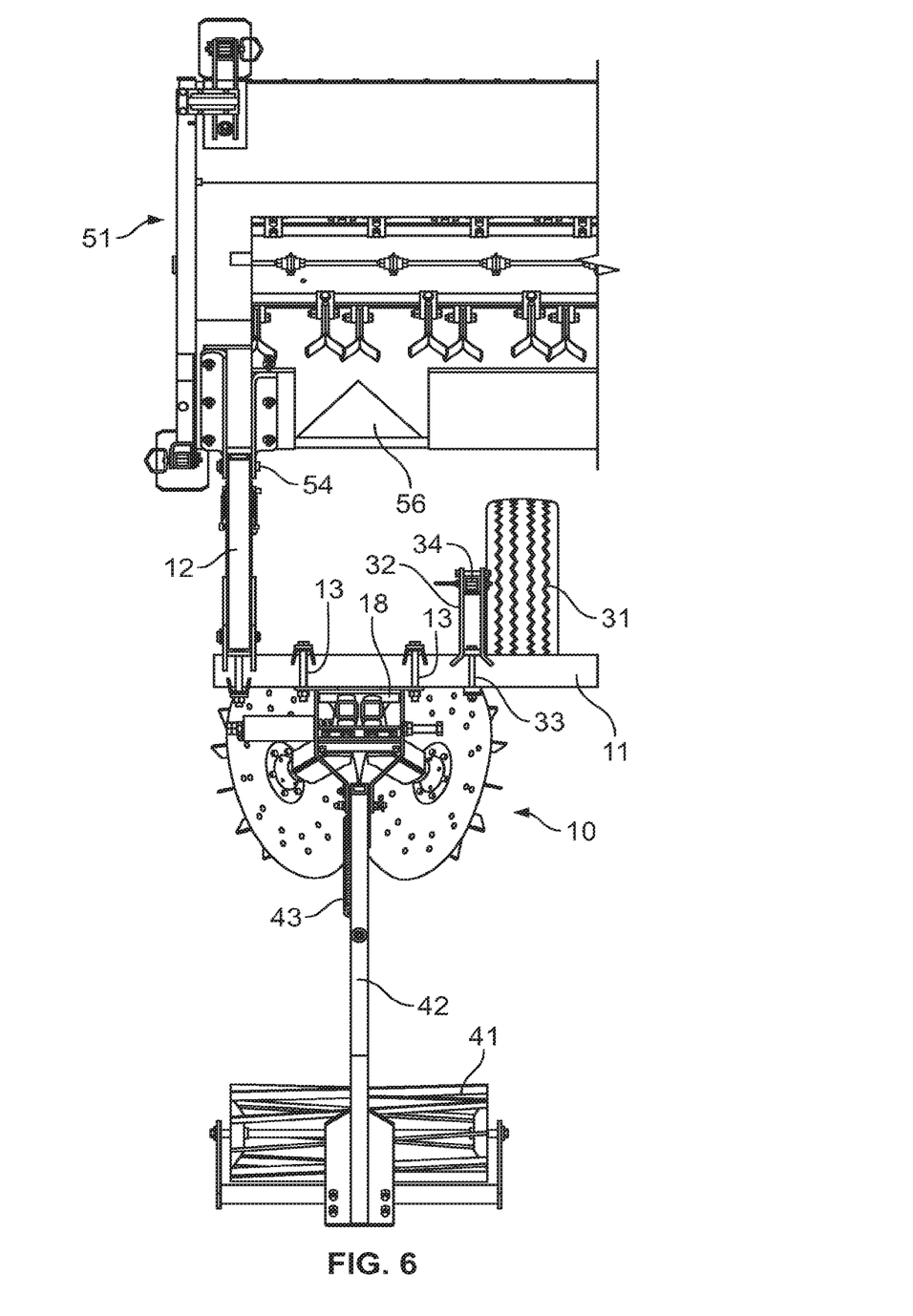
FIG. 6 is a top plan view of the embodiment shown in FIG. 5.

Even greater efficiency can be achieved by combining the stalk pullers 10 with a mower shredder as shown in FIGS. 4 to 6. Prior art devices such as shown in U.S. Pat. No. 3,770,064 have combined pullers with comminuting shredders wherein the puller was mounted in front of the comminuting shredder and was intended to disrupt the soil. We have found this to be an undesirable configuration. The wear of the shredder blades is accelerated because of the dirt on the roots and the dirt that is thrown into the cutting area by the forwardly mounted pullers. We are intentionally putting the cutting element ahead of the puller to avoid this undesirable condition. In our combination a mower/shredder 51 shreds the stalks ahead of the puller 10 using blades 52 that spin about an axis 53 transverse to the direction to travel shown by arrow A in FIG. 5. It should be understood that any suitable mower/shredder mechanism can be used for this element. The mower/shredder 51 has attachment points 54 or a bar at which linkages 12 can be attached to connect the mower/shredder 51 to the rear attachments including the disc pullers 10.

Disc pullers 10 are mounted to the rear attachment or tool bar 11. The mower/shredder 51 may carry a residue diverter 56 centered over the row and in front of the disc pullers 10 to divert loose residue away for the area where the discs 23 and 24 will be entering the ground. The diverter 56 may be a pair of vertically oriented plates, welded to each other at one end with an included angle forming a V-shape with the plates diverging ahead of the disc pullers to deflect debris. It should also be understood that the diverter can be mounted in any fashion ahead of the disc puller such as by mounting to a tool bar or to a forward mechanism. The diverters enhance the operation of the disc puller by reducing the accumulation of debris at the puller. The disc pullers 10 are calibrated with gauge wheels 31 to control the depth that the discs penetrate the ground. Finally, the discs 23 and 24 are followed by a roller basket 41 which finishes the field off. It should thus be understood that the entire mowing/shearing, stalk pulling, and smoothing operation can be accomplished in one pass by this unique combination of elements without delay occasioned by adjusting or replacing stalk pullers when they become worn or broken by rocks and debris and also improving the efficiency and service life of the shredder blades. Accordingly, great savings of time and efficiency of process may be realized by incorporating our invention.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

What is claimed is:

1. An apparatus to be pulled by a prime mover for removing stalks from a field after crops have been harvested therefrom comprising:
   a) a mower/shredder connected to said prime mover for comminuting the stalks of previously harvested crop above ground level;
   b) at least one stalk puller connected to a rear of said mower/shredder in alignment with rows of said crop, said at least one stalk puller including: a first disc rotatably mounted about an axle extending at an angle offset from a direction of travel of said prime mover such that said first disc engages the ground and is induced to rotate by movement of the prime mover, a first disc arm supporting said first disc from a connection to a mount detachably affixed to said mower/shredder, a second disc rotatably mounted about an axle extending transversely to the direction of travel of said prime mover such that an edge of said second disc converges with and contacts a proximal surface of said first disc at a pinch point near where said first disc engages the ground and such that said second disc engages the ground and rotates concomitantly with said first disc, a second disc arm supporting said second disc from a second connection to said mount; and
   c) an adjustment bolt engaged with said mount and said first disc arm to selectively position said first disc arm to maintain said pinch point at a desired location.

2. An apparatus according to claim 1, further comprising a gauge wheel connected to said mount and adjustable in height to maintain said pinch point at a selected depth relative to the ground.

3. An apparatus according to claim 1, further comprising a roller basket connected to said mount and positioned for engagement with the ground at a position rearward of said pinch point relative to the direction of travel of said prime mover.

4. An apparatus according to claim 1, further comprising a tool bar providing connection between said mount and said mower/shredder.

5. An apparatus according to claim 4, further comprising a gauge wheel connected to said mount and adjustable in height to maintain said pinch point at a selected depth relative to the ground and wherein the tool bar provides connection between said mount and said gauge wheel.

6. An apparatus according to claim 4, wherein said tool bar is connected to said mower/shredder via a parallel linkage.

7. An apparatus according to claim 1, further comprising a diverter mounted forward of said pinch point and rearward of said mower/shredder to divert debris from said mower/shredder from said pinch point.

8. An apparatus to be pulled by a prime mover for removing stalks from a field after crops have been harvested therefrom comprising:
   a) a mower/shredder connected to said prime mover for comminuting the stalks of previously harvested crop above ground level;
   b) at least one stalk puller connected to a rear of said mower/shredder in alignment with rows of said crop, wherein said at least one stalk puller dislodges the stalks from the ground and releases the stalks onto the ground; and
   c) a diverter mounted forward of said at least one stalk puller and rearward of said mower/shredder to divert debris from said mower/shredder from said at least one stalk puller,
   wherein said at least one stalk puller is connected to said mower/shredder by parallel linkages.

9. An apparatus according to claim 8, further comprising a mount detachably affixed to said mower/shredder and a roller basket connected to said mount and positioned for engagement with the ground at a position rearward of said at least one stalk puller relative to said prime mover.

* * * * *